Jan. 9, 1923.  E. S. GLOVER.  1,441,415.
SHOCK ABSORBER.
FILED JAN. 19, 1922.

Inventor
Edward S. Glover

Attorney

Patented Jan. 9, 1923.

1,441,415

UNITED STATES PATENT OFFICE.

EDWARD S. GLOVER, OF PINEY FLATS, TENNESSEE.

SHOCK ABSORBER.

Application filed January 19, 1922. Serial No. 530,307.

*To all whom it may concern:*

Be it known that I, EDWARD S. GLOVER, a citizen of the United States, residing at Piney Flats, in the county of Sullivan, State of Tennessee, have invented certain new and useful Improvements in Shock Absorbers; and I do hereby declare the following to be a full, clear, and exact description of the invention, such as will enable others skilled in the art to which it appertains to make and use the same.

This invention relates to new and useful improvements in springs and particularly to springs for use on vehicles.

One object of the invention is to provide a vehicle spring which is strong and durable in its construction and which will serve to absorb shocks.

Another object is to provide a vehicle spring of such construction that the main portion of the spring will be protected from breakage under severe strains.

Other objects and advantages will be apparent from the following description when taken in connection with the accompanying drawing.

Figure 1:
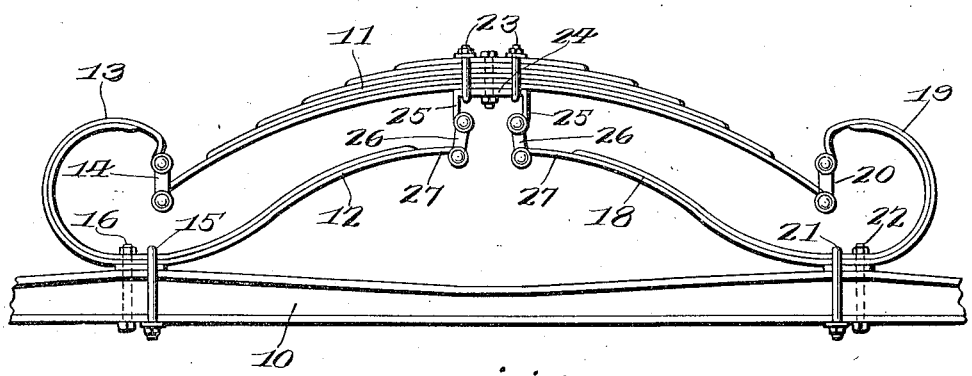
Figure 1 is an elevation of a vehicle spring made in accordance with the invention.
Figure 2:
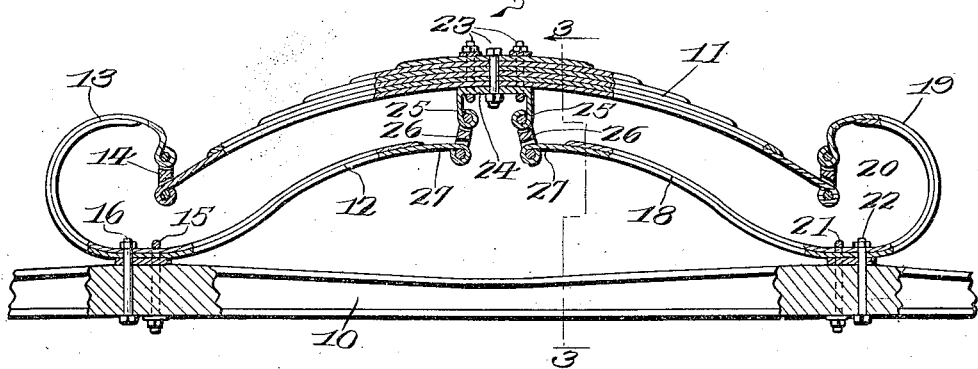
Figure 2 is a vertical longitudinal central sectional view through the spring.
Figure 3:
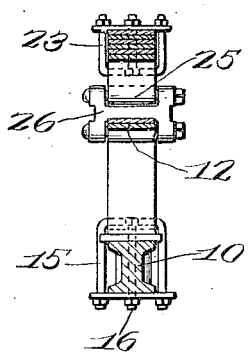
Figure 3 is a vertical transverse sectional view on the line 3—3 of Figure 1.

Referring particularly to the accompanying drawing, 10 represents the front axle of an automobile, above which is disposed the main spring 11, which spring is of the laminated semi-elliptic type. A laminated spring 12 has one end curled upwardly and inwardly over one end of the main spring 11, as shown at 13, and is connected therewith by means of the pivoted shackle 14. The portion of the spring 12, directly below the shackle 14, is secured to the axle 10 by means of the U-clip 15. Another bolt 16 is also disposed through this portion of the spring 12, and the axle, for holding the radius rod (not shown). At the other end of the main spring 11 is disposed a similar spring 18, said spring having one end curled upwardly and inwardly over the adjacent end of the spring 11, as shown at 19, and secured to said main spring end by means of a pivoted shackle 20. The portion of the spring 18, directly below the shackle 20 is secured to the axle 10, by means of the U-clip 21, a bolt 22 being also disposed through the spring 18 and the axle for holding the radius rod (not shown).

Supported by the lower ends of the main spring bolts 23, is a plate 24, the same having the pairs of depending apertured ears 25, to which are pivoted the shackles 26. The springs 12 and 18 extend longitudinally over the axle 10, and beneath the main spring 11, and each has its inner end turned downwardly, as shown at 27. To each of these inner ends 27 is pivotally connected the lower ends of a pair of the shackles 26.

By this construction, when downward force is exerted on the spring 11, the shock will be absorbed by the minor springs 12 and 18, the rebound of main spring being checked, or retarded by the said minor springs.

Particular attention is called to the fact that the springs 12 and 18 may be readily applied to the front spring of an automobile without modifications to the main spring, the outer ends of the springs 12 and 18 being connected to the ends of the main spring. Furthermore, the intermediate portion of the main spring 11 is braced and supported by the inner ends of the auxiliary springs 12 and 18.

What is claimed is:

In a shock absorbing attachment for an automobile, the combination with the main semi-elliptic spring and the axle of the automobile, of a pair of leaf springs each having one end secured to the axle beneath an end of the main spring and having said end curled upwardly and inwardly over the end of the main spring, a plate secured to the intermediate portion of the main spring, the leaf springs extending longitudinally inwardly over the axle and having said ends turned slightly downward, and shackles carried by the said plate and connected with the downwardly turned ends of the leaf springs.

In testimony whereof, I affix my signature, in the presence of two witnesses.

EDWARD S. GLOVER.

Witnesses:
H. H. SMITH,
ROY L. MARION.